US008230043B2

(12) United States Patent
Solis

(10) Patent No.: US 8,230,043 B2
(45) Date of Patent: Jul. 24, 2012

(54) DOCUMENTATION PROCESS FOR INVOKING HELP FROM A SERVER

(75) Inventor: Cheryl Solis, Menlo Park, CA (US)

(73) Assignee: Oracle International Corporation, Redwood Shores, CA (US)

(*) Notice: Subject to any disclaimer, the term of this patent is extended or adjusted under 35 U.S.C. 154(b) by 937 days.

(21) Appl. No.: 11/347,393

(22) Filed: Feb. 3, 2006

(65) Prior Publication Data
US 2007/0185976 A1  Aug. 9, 2007

(51) Int. Cl.
G06F 5/06 (2006.01)
(52) U.S. Cl. ........ 709/219; 715/273; 715/205; 715/215; 715/238; 709/203; 709/202; 709/223; 709/220
(58) Field of Classification Search ........ 709/219, 709/220, 223, 202, 203; 715/708, 738, 205, 715/273
See application file for complete search history.

(56) References Cited

U.S. PATENT DOCUMENTS

| 6,584,507 B1* | 6/2003 | Bradley et al. ........ 709/229 |
| 7,225,249 B1* | 5/2007 | Barry et al. ........ 709/227 |
| 7,424,510 B2* | 9/2008 | Gross et al. ........ 709/203 |
| 2001/0047395 A1* | 11/2001 | Szutu ........ 709/217 |
| 2002/0019837 A1* | 2/2002 | Balnaves ........ 707/512 |
| 2002/0152401 A1* | 10/2002 | Zhang et al. ........ 713/201 |
| 2002/0161611 A1* | 10/2002 | Price et al. ........ 705/7 |
| 2003/0028650 A1* | 2/2003 | Chen et al. ........ 709/229 |
| 2003/0126136 A1* | 7/2003 | Omoigui ........ 707/10 |
| 2004/0034706 A1* | 2/2004 | Cohen et al. ........ 709/225 |
| 2004/0181525 A1* | 9/2004 | Itzhak et al. ........ 707/5 |
| 2006/0143568 A1* | 6/2006 | Milener et al. ........ 715/738 |
| 2006/0212533 A1* | 9/2006 | Vedula ........ 709/217 |
| 2007/0136667 A1* | 6/2007 | Gerhart et al. ........ 715/705 |
| 2007/0162294 A1* | 7/2007 | Davidson et al. ........ 705/1 |

OTHER PUBLICATIONS

"Creating Effective Java Help"—Kevin Lewis published by O'Reilly & Assoc, May 2000.*
"Creating custom JSP Tag Libraries"—Java Sun http://java.sun.com/developer/Books/javaserverpages/cservletsjsp/chapter14.pdf Apr. 2000.*
"Installing the stand-alone help system" http://help.eclipse.org/help30/topic... Last visited: Jan. 5, 2006; pp. 3.
Portal "The guide to Computing Literature" http://portal.acm.org/citation.cfa?id... Last Visited: Jan. 5, 2006; pp. 3.
Asher, et al., "Creating a Hypertex Help System for a GUI-Based Client/Server Application" pp. 269-271, Jun. 1994.
Solutionsoft "Deploying HTML Help Systems" http: www.solutionnsoft.com/pub2... Last Visited: Jan. 5, 2006; pp. 2.
Michelle Corbin "Design Checklists for Online Help" http:www.winwriters.com... Last Visited: Jan. 5, 2006; pp. 7.
Matthew Ellison "Review of LinKit! 4.0" http:www.winwriters.com/... Last Visited: Jan. 5, 2006; pp. 7.
Robert Krull "Problems in Navigating Online Help: Clues from User Search Patterns" http:www.winwriters.com/ Last Visited: Jan. 5, 2006; pp. 5.

(Continued)

Primary Examiner — Krista Zele
Assistant Examiner — Randy Scott
(74) Attorney, Agent, or Firm — Fliesler Meyer LLP

(57) ABSTRACT

The use of a map at a server allows flexibility to the operation of a help system.

15 Claims, 3 Drawing Sheets

OTHER PUBLICATIONS

KingLeon "Integrated Help Into Your .Net Apps" http:www.codeproject.com... Last Visited: Jan. 5, 2006; pp. 14.

Matthew Lee Barannon "Creating Paltform-Independent, Contex-Sensitive User Assistance"; Dec. 1999; http://www.infoloom.com... Last Visited: Jan. 5, 2006; pp. 25.

HCi Journal "Context-sensitive help for a mainframe application" http://www.hic.com.au/... Last Visited: Jan. 5, 2006; pp. 4.

"Installing the stand-alone help system" http://help.eclipse.org/help30... Last Visited: Jan. 5, 2006; pp. 3.

Kevin Lewis, "Creating Effective Java Help" JAVA Series; O'Reilly & Assoc.; May 2000. Book.

Steve Wexler, "The Official Microsoft HTML Help Authoring Kit: Understanding, Creating, and Migrating to Microsoft HTML Help"; by Microsoft Press, 1998 WexTech Systems, Inc. Book, Feb. 1998.

\* cited by examiner

DOCUMENTATION PROCESS FOR INVOKING HELP FROM A SERVER

BACKGROUND OF INVENTION

Software product offerings can require the ability to package and re-package software products to fit customer requirements. Loosely-coupled software systems can be disconnected and re-formed into new product lines. Re-packaging code has become an easier and more modular process. Software product documentation continues to pose a high degree of cost and overhead for re-packaging. This issue will only grow worse as companies move to component-based software and mobile or fluid software components.

In addition, complex software often integrates third-party tools. It is desired to lower the barriers to integration including the integration of product information. Added to the mix is the need to support organizations developing software and documentation at multiple globe-spanning locations.

Software vendors have traditionally provided vehicles for product information that either support ease-of-access or dynamic information delivery. They tend to be either very tightly-coupled systems such as context-sensitive help or extremely loosely-coupled systems such as printed books or our server-based documentation offerings. When software technologies undergo a shift, they are sometimes followed by a shift in the delivery system for supporting product information. Printed books gave way to online-CDs; CDs gave way to HTML and Internet browsers.

DETAILED DESCRIPTION

Figure 1:
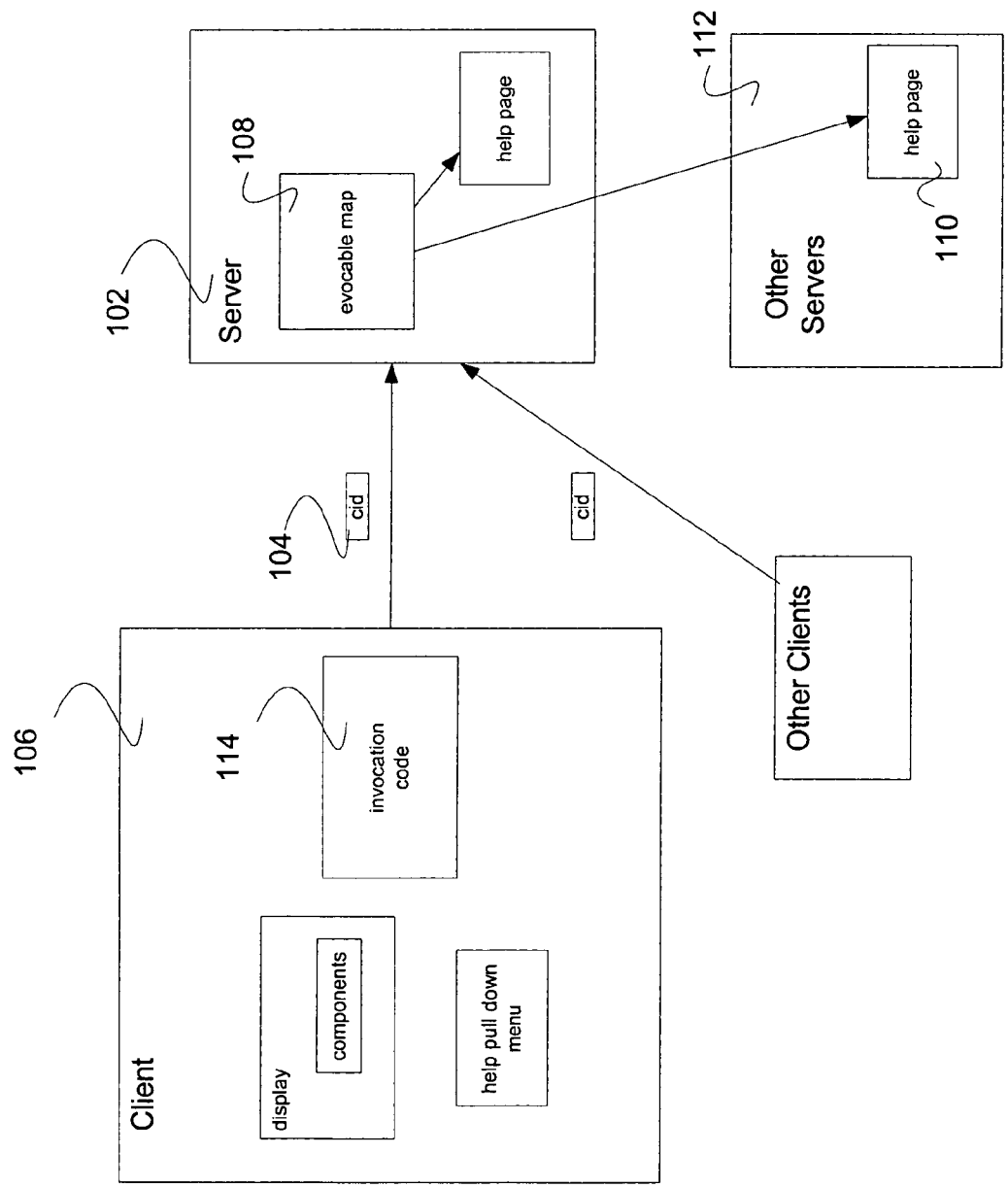
FIG. 1 is a diagram of a help system of one embodiment.

In context sensitive help systems, an identifier, such as component ID (cid), can be associated with a link to a help page. A map file can be a document such as an XML document that contains the matching identifiers paired to links. In many help systems, the file names are hard coded into the software making it difficult to update and change the file contents, the file name, and the file location. These constraints force all sorts of awkward work for the writing teams and the developers trying to support these systems.

One embodiment of the present invention is a computer implemented method. At a server 102, an identifier 104 is received from a client 106. A map 108 is used to determine a link associated with the identifier 104. The link is used to obtain a help page 110.

Having the map at the server can provide for a number of advantages. For example, the map can be changed after the software is sent to the user and the location of the help pages can be changed dynamically.

The links can be HTML links or any other type of link to help pages. The link can point to help pages at the same or different servers, such as server 112. The help page 110 can be an HTTP page or can use another protocol supported by the clients browser. The identifier 104 can relate to context sensitive help, such as help relating to components of a software display at the client. The identifier 104 can be a title of a GUI element, such as a Java name for a GUI element.

One embodiment of the present invention is a computer implemented system including a server 102 that receives an identifier 104 from a client 106. The server 102 can use a map 108 to determine a link associated with the identifier. The link can be used to obtain a help page 110.

One embodiment of the present invention is a computer implemented method. At a client 106, invocation code 114 is used to determine an identifier 104. The client provides the identifier 104 to a server 102 so that the server 102 can use map 108 to determine a link to a help page 110.

Figure 2:
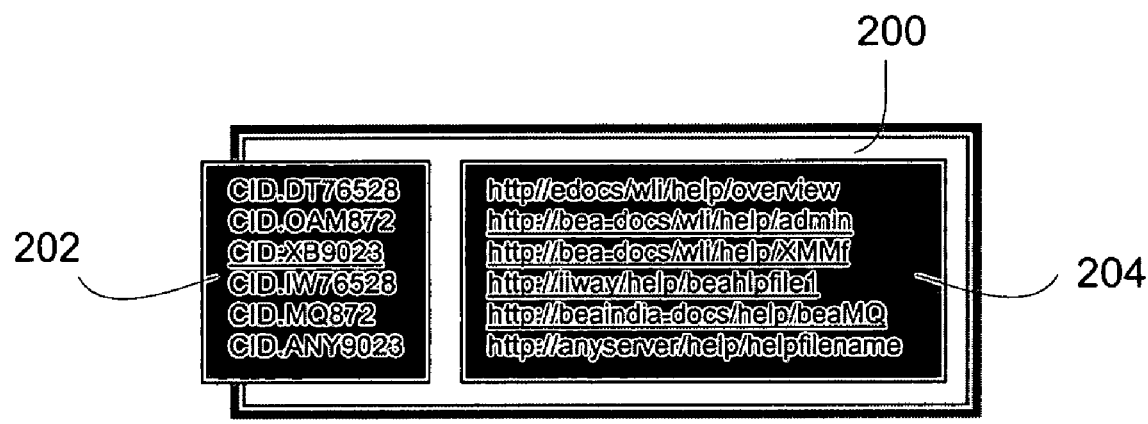
FIG. 2 shows a map that can be used in one embodiment of the present invention.
Figure 3:
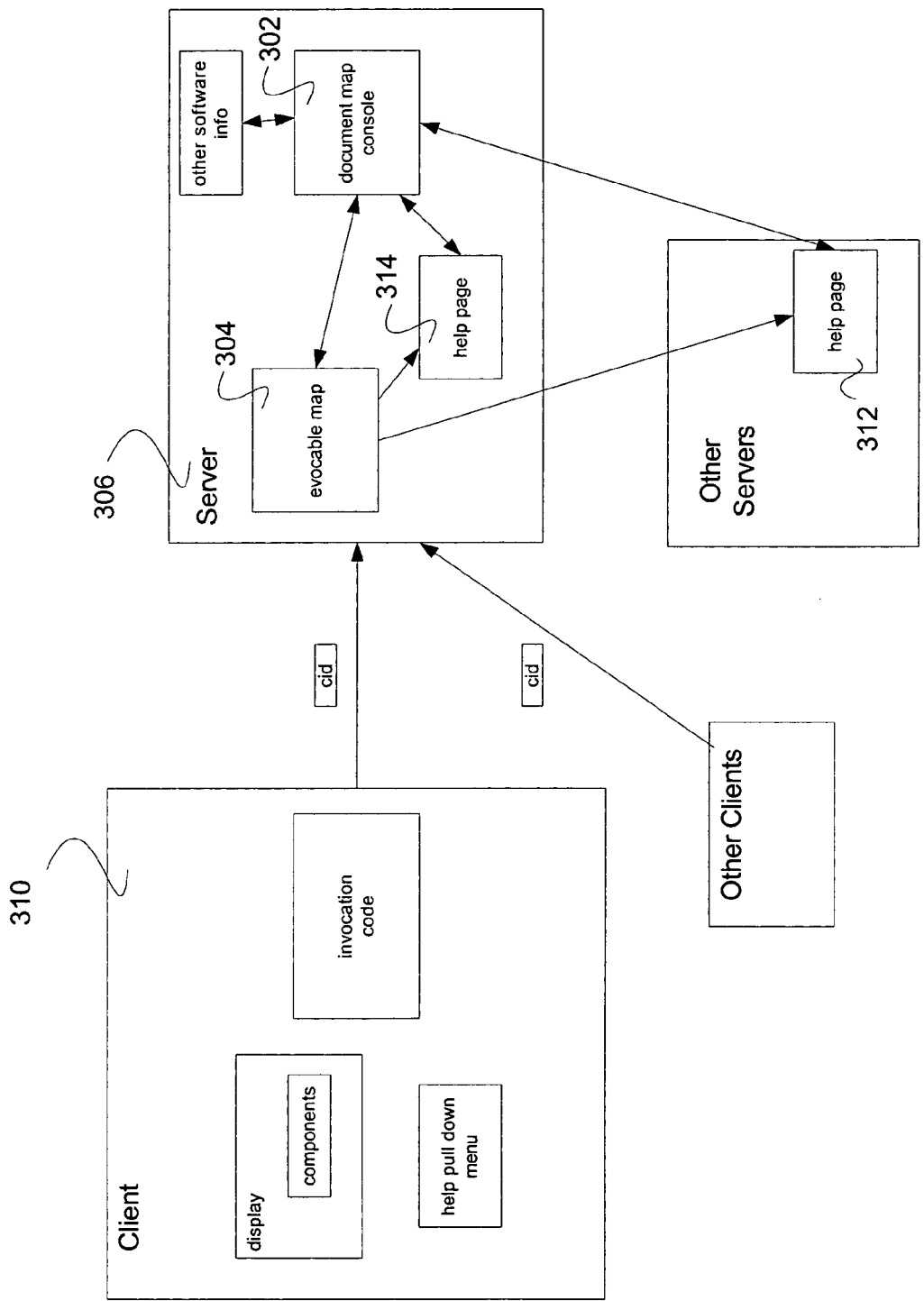
FIG. 3 shows a help system with a document map console of one embodiment.

FIG. 2 shows an exemplary map 200 that includes identifiers 402 and associated links 204. Such a map at the server side can be used to obtain the help pages for the client.

Moving the evocable map to the server can satisfy the majority of online help requirements. A server-based map can be dynamically updated to reflect changing file names and file locations. An online help component ID can remain a fixed id but it can be mapped to files containing discreet tasks or complex procedures. Procedures have a chance to be reusable as long as the underlying component docs not significantly change interaction behavior. Even if the component changes, the help writer can concentrate on revising the single-source documentation on the server instead of creating multiple versions of the same information for differently packaged components.

One embodiment of the present invention is a computer implemented system comprising a document map console 302 that allows for the updating of a map 304 at a server 306. The map 304 can indicate associated links for the indications from client 310. The links can point to help pages, such as help pages 312 and 314.

The document map console 302 can include a wizard associating help identifications with links. The document map console can provide a mockup of a software GUI and allow a user to graphically select a GUI element to associate with a link.

A document map console can be used to map component ids to multiple topics or for structuring the experience of the context-sensitive help. A document map console can provide multiple functions such as:

Easy visual tool for mapping component ids to topic files. No error-prone hand coding or dependence on shareware products. Content can always be invoked in a Web-Browser and can be PDF, HTML, or eventually XML when browsers provide the necessary support. Visual mapping will make switching to new content formats while preserving existing information an easier task.

Automatic monitoring of access to content. This can enable the writing groups to easily refine information offerings based on dynamic measurement of customer usage.

Visual tools for structuring information on the fly.

The Document Map Console can reside on the server. An information designer can use the console to create help maps, add new files to the help maps, and eventually monitor usage.

On the client side, the user interface for a software application can provide context sensitive help. For example, the F1 key can display an appropriate page of help depending upon where the application cursor is located. The application can enable this by setting a document ID tag for each type of object that can be the focus of the cursor. When the F1 key is pressed, the application can spawn a browser window with a URL that points to a server containing HTML help pages for that application. The URL can contain the desired document ID tag as an HTTP parameter.

A servlet running on the server can handle the URL, looking up the HTML help page corresponding to the passed document ID tag. The servlet can send that page to the browser for display. The server can have the entire map loaded in memory in a quick-access data structure. The Document Design Console can be used to update these in-memory maps when changes to the HTML help pages are uploaded to the server.

If that HTML page contains a link to other context sensitive help pages, those links can invoke a Javascript function that first creates a URL like that described above, and then redirects the browser to that URL. By using a Javascript call, the location of the server can be changed on the fly, and other changes to the invocation protocol can be implemented without affecting the content and links within the help pages.

A related feature of moving online help map files and content files to pure server-based delivery, enables dynamic updating of context-sensitive help. A structured table of contents that also contains IDs that resolve at the server can be used for other non-context sensitive help.

Although there is no limitation to the type of information that can be called via this mechanism, the content can be structured to discreet procedures, tasks, and step-by-step information. The help map and server-side invocation can co-exist with client-side local-file dependant systems. The content can support software components in heterogeneous environments.

The use of a map at the server side can allow for:
Support for re-packaged software products. Fundamentally, all GUI software products can have their context-sensitive help topics always available without the need for including content in the build. Topics can change dynamically on the server and the software always points to the right topic.
Support for reusable components. This approach moves us to providing the product information support for components that move from one system to another. When only an ID and invocation code are required to move, there is less complexity involved than re-building and re-integrating content for a component with a new host system.
Support for heterogeneous documentation development teams. A key element of this plan is to have the software presentation layer always provide a skinned help system presentation frame for help content. The GUI owns the look and feel so that content lives in a help system that matches the GUI look-and-feel. The content developers focus on writing not redesigning the help system look-and-feel for every GUI. We define a standard framework that can be reused and can be skinnable.

With this approach, there is less need for centralized infrastructure teams or rigid centralized approaches to information development. Consistency is in-built, the help always matches the host GUI, information does not have to be centrally located it can be invoked on any server. Writing teams can remain close to the action, close to the engineering development activities. Writing teams also can exist anywhere the engineers are located, whether in the US, in India, or in Beijing because their focus returns to the core task of writing and structuring information not rebuilding help infrastructure for every new GUI.

Old approaches, suffer from a number of limitations that incur cost in terms of resources, time, and the retooling of help infrastructure for every new project. This can include packaging HTML and PDF files on the client and retooling and redesigning for every new packaging effort. This is high-overhead, high cost and slow. Every writer must learn a complex system and funnel their content to a single endpoint through many checkpoints. A large supporting infrastructure layer is otherwise needed to support guiding help writers to develop content to fit our complex existing systems.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nano systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:
1. A computer implemented method comprising:
distributing an application to a client, the application including at least one component, wherein a tag is added to the at least one component, and the component is associated with a document identifier, and wherein setting the tag invokes code to open an information page containing context-sensitive information relating to the at least one component;
maintaining a central evocable map at a server accessible to the client, wherein the central evocable map indicates a link associated with the document identifier that identifies the information page, and wherein the server includes a servlet used to retrieve the information page;
receiving, at the server, a request from the client to retrieve the information page, the request including the docu- ment identifier, wherein the request is sent to the server when a cursor is simultaneously held over the component and the tag is invoked;

matching the document identifier received with the request to the link provided by the central evocable map, wherein the servlet at the server retrieves the information page using the link, and provides to the client the information page requested;

modifying the central evocable map using a document map console, wherein the document map console is used to
  associate the link with the document identification tag using a graphical user interface at the map console,
  monitor access to context-sensitive information relating to the component, and
  update the central evocable map at the server, either by associating a new link with the document identifier based on the monitored access to the context-sensitive information relating to the component, the new link pointing to a new information page, or by modifying the context-sensitive information based on the monitored access to the context-sensitive information relating to the component; and wherein when a subsequent request including the document identifier is received at the server, the received document identifier is matched to the new link provided by the central evocable map, and wherein the servlet at the server retrieves the new information page associated with the document identifier, and provides to the client the new information page requested.

2. The method of claim 1, wherein the link is an HTML link.

3. The method of claim 1, wherein the information page is an HTTP page.

4. The method of claim 1, wherein the identifier is a title of a GUI element.

5. The method of claim 1, wherein the identifier is selected using a help menu.

6. A computer implemented system comprising:
  a client, including one or more processors, said client configured to receive a request from an application running on the client, the application including a at least one component, wherein a tag is added to the at least component, and the component is associated with a document identifier, and wherein setting the tag invokes code to open an information page containing context-sensitive information relating to the at least component
  a central evocable map accessible to the client maintained at a server, wherein the central evocable map indicates a link associated with the document identifier that identifies the information page, and wherein the server includes a servlet used to retrieve the information page, wherein the server receives a request from the client to retrieve the information page, the request including the document identifier, and wherein the request is sent when a cursor is simultaneously held over the component and the tag is invoked;
  wherein the document identifier received with the request is matched to the link provided by the central evocable map, wherein the servlet at the server retrieves the information page using the link, and provides to the client the information page requested;
  a document map console that updates the central evocable map at the server, wherein when updating the central evocable map, the document map console is configured to
    associate the link with the document identification tag using a graphical user interface at the map console,
    monitor access to context-sensitive information relating to the component, and
    update the central evocable map at the server, either by associating a new link with the document identifier based on the monitored access to the context-sensitive information relating to the component, the new link pointing to a new information page, or by modifying the context-sensitive information based on the monitored access to the context-sensitive information relating to the component; and
  wherein when a subsequent request including the document identifier is received at the server, the received document identifier is matched to the new link provided by the central evocable map, and wherein the servlet at the server retrieves the new information page associated with the document identifier, and provides to the client the new information page requested.

7. The system of claim 6, wherein the link is an HTML link.

8. The system of claim 6, wherein the information page is an HTTP page.

9. The system of claim 6, wherein the identifier is a title of a GUI element.

10. The system of claim 6, wherein the identifier is selected using a help menu.

11. A non-transitory computer readable medium, including instructions stored thereon which when executed cause the computer to perform the steps of:
  distributing an application to a client, the application including at least one component, wherein a tag is added to the at least one component, and the component is associated with a document identifier, and wherein setting the tag invokes code to open an information page containing context-sensitive information relating to the at least one component;
  maintaining a central evocable map at a server accessible to the client, wherein the central evocable map indicates a link associated with the document identifier that identifies the information page, and wherein the server includes a servlet used to retrieve the information page;
  receiving, at the server, a request from the client to retrieve the information page, the request including the document identifier, wherein the request is sent to the server when a cursor is simultaneously held over the component and the tag is invoked;
  matching the document identifier received with the request to the link provided by the central evocable map, wherein the servlet at the server retrieves the information page using the link, and provides to the client the information page requested;
  modifying the central evocable map using a document map console, wherein the document map console is used to
    associate the link with the document identification tag using a graphical user interface at the map console,
    monitor access to context-sensitive information relating to the component, and
    update the central evocable map at the server, either by associating a new link with the document identifier based on the monitored access to the context-sensitive information relating to the component, the new link pointing to a new information page, or by modifying the context-sensitive information based on the monitored access to the context-sensitive information relating to the component; and
  wherein when a subsequent request including the document identifier is received at the server, the received document identifier is matched to the new link provided by the central evocable map, and wherein the servlet at the server retrieves the new information page associated with the document identifier, and provides to the client the new information page requested.

12. The non-transitory computer readable medium of claim 11, wherein the link is an HTML link.

13. The non-transitory computer readable medium of claim 11, wherein the information page is an HTTP page.

14. The non-transitory computer readable medium of claim 11, wherein the identifier is a title of a GUI element.

15. The non-transitory computer readable medium of claim 11, wherein the identifier is selected using a help menu.

* * * * *

UNITED STATES PATENT AND TRADEMARK OFFICE
CERTIFICATE OF CORRECTION

| | | |
|---|---|---|
| PATENT NO. | : 8,230,043 B2 | Page 1 of 1 |
| APPLICATION NO. | : 11/347393 | |
| DATED | : July 24, 2012 | |
| INVENTOR(S) | : Solis | |

It is certified that error appears in the above-identified patent and that said Letters Patent is hereby corrected as shown below:

On the Title Page:

Item (56): In column 2, under "Other Publications", line 13, delete "Hypertex" and insert -- Hypertext --, therefor.

Item (56): In column 2, under "Other Publications", line 13, delete "solutionnsoft" and insert -- solutionsoft --, therefor.

On page 2, In column 1, under "Other Publications", line 3 delete "Paltform-Independent, Contex-" and insert -- Platform-Independent, Context- --, therefor.

In the Specifications:

In column 2, line 20, delete "docs" and insert -- does --, therefor.

In column 5, line 46, in Claim 6, delete "component" and insert -- component; --, therefor.

Signed and Sealed this
Thirteenth Day of November, 2012

David J. Kappos
*Director of the United States Patent and Trademark Office*